United States Patent
Uno et al.

(10) Patent No.: US 6,477,135 B1
(45) Date of Patent: Nov. 5, 2002

(54) OPTICAL INFORMATION RECORDING MEDIUM AND METHOD FOR RECORDING AND REPRODUCTION INFORMATION THEREON

(75) Inventors: Mayumi Uno, Osaka (JP); Noboru Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/274,398

(22) Filed: Mar. 23, 1999

(30) Foreign Application Priority Data

Mar. 26, 1998 (JP) ............................................. 10-079060

(51) Int. Cl.⁷ ................................................. G11B 7/24
(52) U.S. Cl. ................................. 369/275.2; 369/13.38; 369/13.4
(58) Field of Search ........................... 369/275.2, 275.4, 369/283, 100, 116, 284, 13.38, 13.4; 428/64.1, 64.4, 913; 430/19, 270.13, 945

(56) References Cited

U.S. PATENT DOCUMENTS

| | | | |
|---|---|---|---|
| 5,123,007 A | * 6/1992 | Miyauchi et al. | 369/100 |
| 5,395,669 A | 3/1995 | Kawahara et al. | 428/64.6 |
| 5,545,454 A | * 8/1996 | Yamada et al. | 428/457 |
| 5,641,606 A | * 6/1997 | Suzuki et al. | 427/164 |
| 5,643,687 A | 7/1997 | Iketani et al. | 428/694 ML |
| 5,681,632 A | 10/1997 | Kitaura et al. | 369/283 |
| 5,958,649 A | * 9/1999 | Hirotsune et al. | 369/275.5 |
| 5,962,100 A | * 10/1999 | Kawai | 369/283 |
| 6,115,352 A | * 9/2000 | Ohno et al. | 369/275.4 |

FOREIGN PATENT DOCUMENTS

| | | |
|---|---|---|
| EP | 0 642 123 | 3/1995 |
| EP | 0 834 874 | 8/1998 |
| EP | 0 847 049 | 10/1998 |
| JP | 5-217211 | 8/1993 |
| JP | 05/062249 | 12/1993 |
| JP | 6-195747 | 7/1994 |
| JP | 7-105574 | 4/1995 |
| JP | 09/161316 | 6/1997 |
| WO | WO 98/28738 | 2/1998 |

* cited by examiner

Primary Examiner—William Korzuch
Assistant Examiner—Kim-Kwok Chu
(74) Attorney, Agent, or Firm—Merchant & Gould P.C.

(57) ABSTRACT

An optical information recording medium includes a recording layer that changes reversibly between a crystalline state and an amorphous state. The irradiation of the recording layer with laser beams at a predetermined wavelength changes the recording layer from one selected from the group consisting of the crystalline state and the amorphous state to the other state. The absorptance Ac of the laser beams in the recording layer when the recording layer is in the crystalline state is larger than the absorptance Aa of the laser beams in the recording layer when the recording layer is in the amorphous state. Crystallization accelerating layers for accelerating the change of the recording layer from the amorphous state to the crystalline state are formed in contact with both surfaces of the recording layer.

59 Claims, 8 Drawing Sheets

OPTICAL INFORMATION RECORDING MEDIUM AND METHOD FOR RECORDING AND REPRODUCTION INFORMATION THEREON

BACKGROUND OF THE INVENTION

1. Field of the Invention

The present invention relates to a phase-changeable optical information recording medium on which information can be recorded, reproduced and rewritten in high density and with high speed by using optical techniques such as irradiation of laser beams, and a method for recording and reproducing information thereon.

2. Description of the Prior Art An optical magnetic recording medium or a phase-changeable recording medium is known as a medium on which information can be recorded in large capacity and reproduced and rewritten at a high speed. A transportable optical recording medium is expected to be more important in a highly information-oriented society. The improvements in the function of applications and in the quality of graphic information require of the medium larger capacity and higher-speed recording or reproducing.

These optical recording media utilize a difference in the optical characteristics of the recording material created by locally irradiating the recording material with laser beams. For example, for the optical magnetic recording medium, a difference in the angle of rotation in a plane of polarization of a reflected light, which is created by a difference in the magnetized state, is utilized for recording, Furthermore, for the phase-changeable recording medium, an amount of reflected light in the crystalline state different from that in the amorphous state when light with a specific wavelength is used is utilized for recording. The phase-changeable recording medium is advantageous because the erasure of recorded information and the overwriting of information can be performed simultaneously by adjusting the output power of the laser, so that it is possible to rewrite information signals at high speed.

FIG. 7 shows a typical layer structure of a conventional optical information recording medium. A resin such as polycarbonate, polymethyl methacrylate (hereinafter, referred to as PMMA) or glass can be used for a substrate 101. The substrate 101 includes a guide groove for guiding laser beams. Protective layers 102 and 104 will be described later. A recording layer 103 is formed of a material that has different optical characteristic states and can change between the different states reversibly. In the case of a rewritable phase-changeable optical recording material, the recording layer 103 can be formed of a so-called chalcogenide such as a material containing Te or Se as a main component, or a material containing Sb such as materials comprising Te—Sb—Ge, Te—Sn—Ge, Te—Sb—Ge—Se, Te—Sn—Ge—Au, Ag—In—Sb—Te, In—Sb—Se, In—Te—Se or the like as a main component. A reflection layer 105 generally is formed of a metal such as Au, Al, Cr or the like, or an alloy of these metals. The reflection layer 105 is provided for the purpose of radiating heat and allowing the recording thin film to absorb light effectively, but the reflection layer need not be provided. For the purpose of preventing the oxidation or the corrosion of the optical information recording medium or the attachment of dust onto the medium, an overcoat layer or a dummy substrate may be formed on the reflection layer 105, although these are not shown in FIG. 7. The dummy substrate may be bonded with an ultraviolet curing resin.

Furthermore, as shown in FIG. 8, a recording medium comprising two protective layers 102 and 106 between the substrate 101 and the recording layer 103 has been proposed. For example, Japanese Laid-Open Patent Publication (Tokkai-Hei) No. 5-217211 discloses a recording medium comprising a recording layer containing Ag, a first protective layer formed of a nitride of SiN or AlN or a carbide of SiC in contact with the recording layer and a second protective layer formed of ZnS or a composite compound containing ZnS on the first protective layer. The first protective layer is formed to suppress a reaction between a constituent S atom of the second protective layer and a constituent Ag atom of the recording layer. Japanese Laid-Open Patent Publication (Tokkai-Hei) No. 6-195747 discloses another example of the recording medium comprising protective layers in a two-layered structure, as shown in FIG. 8. The recording medium includes a first and second protective layers 106 and 102 between a recording layer 103 and a substrate 101. The first protective layer 106 in contact with the recording layer 103 is formed of $Si_3N_4$, and the second protective layer 102 in contact with the substrate 101 is formed of $ZnS—SiO_2$.

The protective layers 102, 104 and 106 serve to protect the recording layer 103 in such a manner that the material for the recording layer 103 is prevented from being oxidized, evaporated or distorted. Furthermore, it is possible to adjust the absorption of the optical information recording medium or a difference in the reflectance between a recorded portion and an erased portion by adjusting the thickness of the protective layers. Thus, the protective layers also serve to adjust the optical characteristics of the medium. Moreover, a material for the protective layers 102, 104 and 106 is required to have good adhesiveness with a material forming the recording layer and the substrate 101 and good weather resistance so that the protective layers 102, 104 and 106 are not cracked. When the protective layers 102, 104 and 106 are used in contact with the recording layer 103, the material for the protective layers is required not to impair the optical change of the material for the recording medium. Examples of the material for the protective layers 102, 104 and 106 include a dielectric such as a sulfide such as ZnS, an oxide such as $SiO_2$, $Ta_2O_5$ or $Al_2O_3$, a nitride such as GeN, $Si_3N_4$ or $Al_3N_4$, a nitrogen oxide such as GeON, SiON or AlON, a carbide, a fluoride or the like, or suitable combinations thereof It is known conventionally that when information is rewritten, a marked position is dislocated slightly after rewriting, namely, a so-called overwrite distortion (distortion in the recorded mark) is caused. This distortion is caused because the temperature increase rate during laser irradiation depends on whether the recording layer was in an amorphous state or a crystalline state before rewriting, whereby a mark after rewriting has a length that does not match a predetermined length. In order to solve this problem, so-called absorption correction is performed by maintaining Ac/Aa in a predetermined range larger than 1, where Aa represents the absorptance in the amorphous portion and Ac represents the absorptance in the crystalline portion. The structure that allows such absorption correction makes the increase in the temperature in marked portions uniform so that the mark distortion is unlikely to occur at rewriting.

For example, Japanese Laid-Open Patent Publication (Tokkai-Hei) No. 7-78354 discloses an information recording medium comprising a metal layer, a protective layer, a recording layer and a reflection layer on a substrate in this order, in which the reflectance after recording is larger than that before recording. Japanese Laid-Open Patent Publication (Tokkai-Hei) No. 7-105574 discloses an optical information recording medium comprising an optical absorption layer formed of Ti on a substrate, in which an optical absorptance in the crystalline state in the recording layer is larger than that in the amorphous state to reduce the dislocation of recorded marks.

Especially when information is rewritten at high speed, the overwrite distortion as described above is caused readily. However, the solution of merely maintaining Ac/Aa larger than 1 cannot provide a sufficient erasure ratio. In addition, when a recording layer composition that allows a high rate of crystallization is used to raise the erasure ratio, it is difficult to obtain sufficient reliability of recorded signals.

SUMMARY OF THE INVENTION

Therefore, with the foregoing in mind, it is an object of the present invention to provide an optical information recording medium that allows high speed recording of information resulting from a high crystallization rate while suppressing the overwrite distortion, and a method for recording and reproducing information thereon. It is another object of the present invention to provide an optical information recording medium that provides signals recorded thereon with high reliability even if the crystallization rate is high and a method for recording and reproducing information thereon.

An optical information recording medium of the present invention includes a recording layer that changes reversibly between a crystalline state and an amorphous state. The irradiation of the recording layer with laser beams at a predetermined wavelength changes the recording layer from one selected from the group consisting of the crystalline state and the amorphous state to the other state. The absorptance Ac of the laser beams in the recording layer when the recording layer is in the crystalline state is larger than the absorptance Aa of the laser beams in the recording layer when the recording layer is in the amorphous state. Crystallization accelerating layers for accelerating the change of the recording layer from the amorphous state to the crystalline state are formed in contact with both surfaces of the recording layer.

This embodiment can provide a medium having a high erasure ratio at high speed rewriting.

A method for recording and reproducing optical information of the present invention is used with the optical information recording medium including a recording layer that changes reversibly between a crystalline state and an amorphous state. The irradiation of the recording layer with laser beams at a predetermined wavelength changes the recording layer from one selected from the group consisting of the crystalline state and the amorphous state to the other state. The absorptance Ac of the laser beams in the recording layer when the recording layer is in the crystalline state is larger than the absorptance Aa of the laser beams in the recording layer when the recording layer is in the amorphous state. Crystallization accelerating layers for accelerating to change the recording layer from the amorphous state to the crystalline state are formed in contact with both surfaces of the recording layer. The method includes the steps of focusing laser beams on a microspot on the optical information recording medium by an optical system, and irradiating the recording layer with the laser beams. A power level of the laser beams is fluctuated between a first power level $P_1$ and a second power level $P_2$ to change the optical information in the recording layer, and the change of the optical information is selected from the group consisting of recording, erasure and overwriting. The optical information is reproduced with the laser beams of a third power level $P_3$. Herein, the first power level $P_1$ is an amorphous state-formation level that allows a local portion in the recording film to change reversibly from the crystalline state to the amorphous state by irradiation of the laser beams. The second power level $P_2$ is a crystalline state-formation level that allows a local portion in the recording film to change reversibly from the amorphous state to the crystalline state by irradiation of the laser beams. The third power level $P_3$ is a reproduction level that is lower than the power levels $P_1$ and $P_2$. The irradiation of the laser beams at $P_3$ does not affect the optical state of the recording layer. The irradiation of the laser beams at $P_3$ provides a sufficient reflectance to reproduce optical information.

This embodiment allows recording and reproducing of information signals at high speed while suppressing overwrite distortion.

As described above, by forming crystallization accelerating layers in contact with the recording layer whose optical characteristic changes reversibly and achieving Ac>Aa, the optical information recording medium allows signals to be rewritten at high speed and has excellent thermal stability of recorded marks and excellent characteristics in repetitive recording. Moreover, the method of the present invention maximizes the performance of the optical information recording medium of the present invention sufficiently.

These and other advantages of the present invention will become apparent to those skilled in the art upon reading and understanding the following detailed description with reference to the accompanying figures.

DESCRIPTION OF THE PREFERRED EMBODIMENTS

Figure 1:
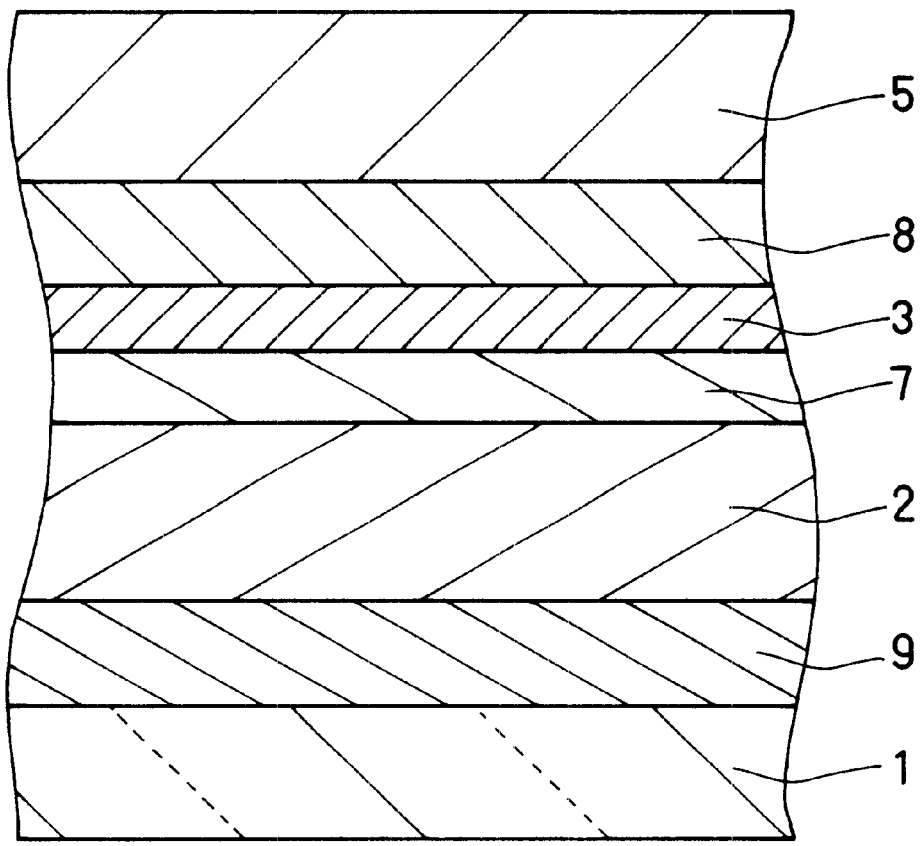
FIG. 1 is a cross-sectional view showing an example of a layered structure of an optical information recording medium of the present invention.
Figure 2:
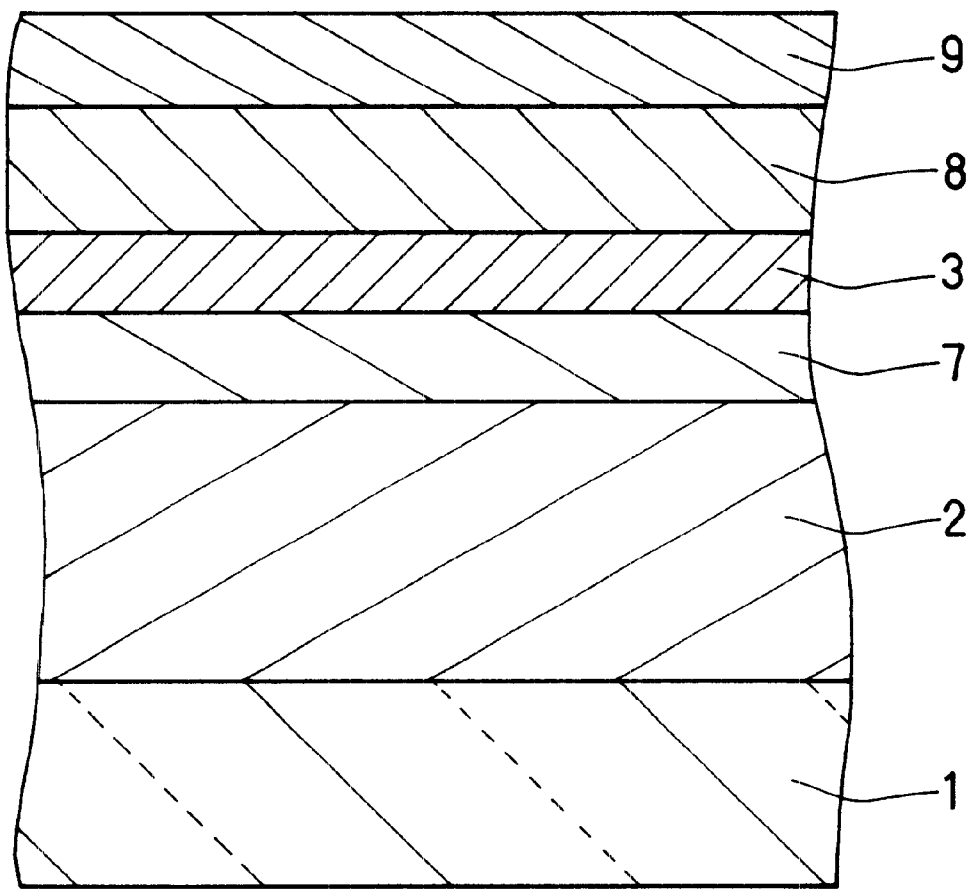
FIG. 2 is a cross-sectional view showing another example of a layered structure of an optical information recording medium of the present invention.
Figure 3:
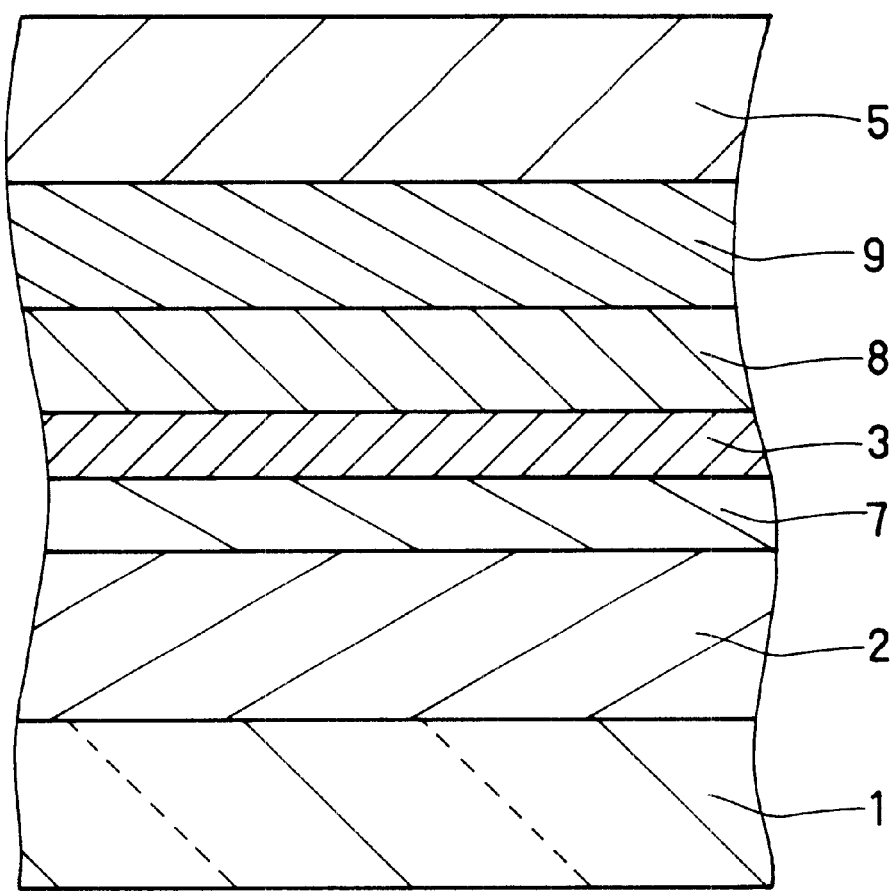
FIG. 3 is a cross-sectional view showing still another example of a layered structure of an optical information recording medium of the present invention.

FIGS. 1 to 3 show examples of a layered structure of an optical information recording medium of the present invention. An optical information recording medium shown in FIG. 1 includes a light beam absorption correction layer 9, a protective layer 2, a first crystallization accelerating layer 7, a recording layer 3, a second crystallization accelerating layer 8, and a reflection layer 5 formed on a substrate 1 in this order. An optical information recording medium shown in FIG. 2 includes a protective layer 2, a first crystallization accelerating layer 7, a recording layer 3, a second crystallization accelerating layer 8, and a light beam absorption correction layer 9 formed on a substrate 1 in this order. An optical information recording medium shown in FIG. 3 includes a protective layer 2, a first crystallization accelerating layer 7, a recording layer 3, a second crystallization accelerating layer 8, a light beam absorption correction layer 9, and a reflection layer 5 formed on a substrate 1 in this order.

However, the present invention is not limited to the above-described structures. For example, the optical information recording medium of the present invention in FIG. 1 may have the following layered structures: (a) an additional layer is provided between the substrate 1 and the light beam absorption correction layer 9; (b) an additional layer is provided between the second crystallization accelerating layer 8 and the reflection layer 5; (c) the entire protective layer 2 is replaced by the first crystallization accelerating layer 7; and (d) no reflection layer is provided. The optical information recording media shown in FIGS. 2 and 3 can have various other structures. For example, in FIG. 2 or 3, a second protective layer may be provided between the second crystallization accelerating layer 8 and the light beam absorption correction layer 9.

The substrate 1 preferably is formed of a resin such as polycarbonate and PMMA, glass or the like. The substrate preferably has a guide groove for guiding laser beams.

The protective layer 2 is provided primarily to adjust the optical characteristics for effective optical absorption in the recording layer 3. The protective layer 2 may be formed of a dielectric that transmits laser beams for recording, reproduction and erasure, for example, a sulfide such as ZnS, an oxide such as $SiO_2$, $Ta_2O_5$, or $Al_2O_3$, a nitride such as GeN (with any valences), $Si_3N_4$, or $Al_3N_4$, a nitrogen oxide such as GeON, SiON, or AlON (with any valences), a carbide, a fluoride or the like, suitable combinations thereof (e.g., ZnS—$SiO_2$), or any other materials that can achieve the above-described objects.

The first and second crystallization accelerating layers 7 and 8 serve to protect the recording layer 3 against oxidation, corrosion, distortion or the like. In addition, the crystallization accelerating layers 7 and 8 serve the following two important functions, resulting from the fact that they are formed in contact with the recording layer 3.

First, the crystallization accelerating layers prevent atomic diffusion or atomic migration between the recording layer 3 and the protective layer 2. Especially when the protective layer 2 comprises sulfur or a sulfide, the crystallization accelerating layers prevent these components from diffusing or migrating into the recording layer 3. The prevention of the atomic diffusion or atomic migration (hereinafter, referred to as "atomic diffusion") of constituent atoms of the protective layer 2 or the recording layer 3 from one of the layers into the other layer improves the repetition characteristics of the medium drastically. In view of the prevention of the atomic diffusion, the crystallization accelerating layer may be formed on either one surface or both surfaces of the recording layer 3. However, it is preferable to form the crystallization accelerating layers 7 and 8 on both surfaces of the recording layer 3 in order to prevent the atomic diffusion more effectively. The effect of the prevention of atomic diffusion is more significant when the crystallization accelerating layer is formed on the side that has a larger load of heat at the interface of the recording layer 3, namely, at the interface of the recording layer 3 where the temperature-increase is larger at the time of recording or erasure. This is generally the side the laser beams strike (i.e., the first crystallization accelerating layer 7). Repetitive recording of information may cause the components included in the crystallization accelerating layers 7 and 8 to diffuse or migrate into the recording layer 3. Therefore, it is preferable to use a material that hardly interferes with a change in the optical characteristics of the recording layer 3 such as Ge, Cr, Si, and Al as a component of the material for the crystallization accelerating layers 7 and 8.

A second important function of the crystallization accelerating layers 7 and 8 is to accelerate crystallization in the recording layer material without compromising the thermal stability of the recorded marks (amorphous portion) when they are provided in contact with the recording layer 3. The acceleration of crystallization allows higher-speed erasure. This effect may be particularly significant when the crystallization accelerating layer is formed at the interface of the recording layer 3 where the temperature increase is smaller, i.e., generally at the interface of the recording layer 3 opposite to the interface the laser beams strike (i.e., the second crystallization accelerating layer 8).

Figure 4:
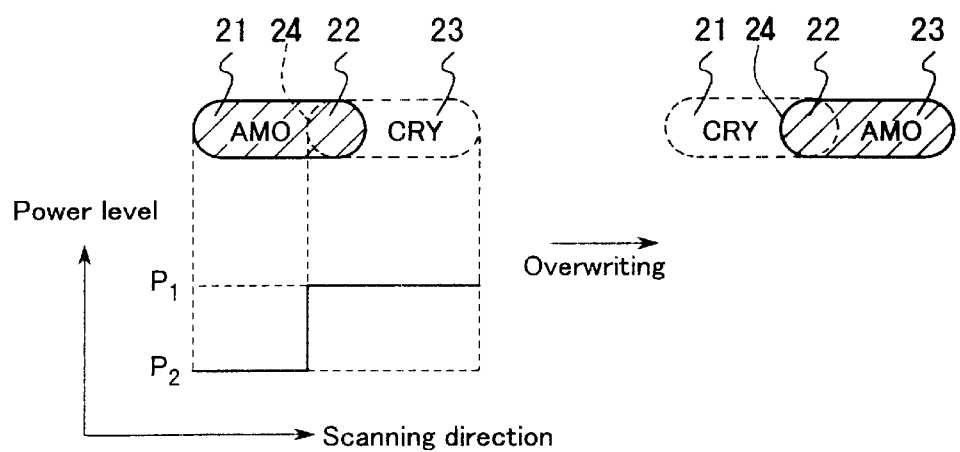
FIG. 4 is a schematic view for illustrating overwrite distortion.

As shown in FIG. 4, in the case of rewriting, when recorded marks (amorphous portions) are overlapped before and after rewriting, not only the transition from an amorphous state to a crystalline state (region 21) and the transition from an crystalline state to an amorphous state (region 23), but also the transition from an amorphous state to an amorphous state (region 22) are caused in the recording layer.

In this case, overwrite distortion is caused primarily in a boundary 24 between the region 21 and the region 22. The reason is as follows. Since the region 22 is amorphous both before and after rewriting, the region 22 requires less latent heat to dissolve crystal than the region 23, which changes from a crystalline state to an amorphous state. Therefore, when the same amount of heat is supplied to the regions 22 and 23 at rewriting, excess heat is generated in the region 22. The excess heat makes the region 21 amorphous, so that the boundary 24 is shifted in the direction of the region 21.

When Ac/Aa is larger than 1, light absorption in the region 22 before rewriting is smaller than that in the region 23. Therefore, the dislocation of the boundary 24 can be reduced. However, since Aa becomes relatively small, light is not absorbed sufficiently to crystallize the region 21, resulting in difficulty in crystallization. Therefore, although the dislocation of the boundary 24 hardly occurs, insufficient crystallization in the region 21 results. Thus, it is difficult to obtain a high erasure ratio after overwriting.

One solution to this problem may be to use a recording layer composition having a high crystallization rate to effect crystallization with a small amount of light absorption. In this case, the region 21 is crystallized readily so that a higher erasure ratio can be obtained. However, faster crystallization produces a trade-off of reduced thermal stability in amorphous portions. This causes a new problem in that it becomes difficult for recorded marks to survive a long-time storage.

In the present invention, the crystallization accelerating layer is provided so that the transition from the amorphous state to the crystalline state is effected with a small amount of light absorption. In this case, even if a recording layer composition having a relatively slow crystallization rate is used to obtain sufficient thermal stability in the amorphous portions, crystallization can be effected at a high rate, thereby obtaining a high erasure ratio.

In the present invention, the crystallization accelerating layers are provided on both surfaces of the recording layer 3 in order to achieve both good characteristics at high-speed rewriting and good repetition characteristics.

The crystallization accelerating layers 7 and 8 may be formed of any material that performs the above-described functions, but preferably a material comprising any one of a nitride, a nitrogen oxide, an oxide or a carbide as a main component. Examples of a nitride include GeN, CrN, SiN, AlN, NbN, MoN, FeN, TiN and ZrN (with any valences, which applies to those described later). Examples of a nitrogen oxide include GeON, CrON, SiON, AlON, NbON and MoON (with any valences, which applies to those described later). Examples of an oxide include $SiO_2$, $Ta_2O_5$ and $Al_2O_3$. Examples of a carbide include CrC, SiC, AlC, TiC, TaC and ZrC (with any valences, which applies to those described later). Alternatively, suitable combinations thereof can be used as well. The crystallization accelerating layers 7 and 8 are preferably formed of a material that hardly allows the atomic diffusion of constituent atoms of the recording layer 3 and the protective layer 2 or a material that hardly interferes with the optical change in the recording layer 3 even if the atoms diffuse to the recording layer 3. In addition, the material preferably accelerates crystallization in the recording layer 3 when the accelerating layers are provided in contact with the recording layer 3.

When the crystallization accelerating layers 7 and 8 are formed of a material comprising Ge or N, more specifically, for example, a material comprising at least one of GeN, GeON, GeXN, and GeXON, where X is a material comprising at least one element selected from the group consisting of Cr, Mo, Mn, Ni, Co and La) as a main component, particularly excellent repetition characteristics and weather resistance can be obtained. However, the effect of the acceleration of crystallization can be obtained substantially equally whichever is used among GeN, GeON, GeXN and GeXON. A substance X is added primarily to improve the weather resistance of a GeN film or a GeON film. Other than the material comprising either one of the above six elements, a material comprising Y, Fe, Ti, Zr, Nb, Ta, Cu, Zn, Pd, Ag, Cd, Hf, or W may be used. In this case, however, it is advantageous to add the material comprising at least one element of the above six elements (Cr. Mo, Mn, Ni, Co and La) in that the weather resistance is improved more effectively.

Furthermore, the crystallization accelerating layers 7 and 8 may be formed of a material comprising ZnS—$SiO_2$ as a main component. It is particularly preferable to use a material in which the ratio of the content of Zn to the content of S ((Zn content)/(S content)) in the crystallization accelerating layers 7 and 8 is larger than 1 (hereinafter, referred to as Zn rich), or a material in which the ratio of the content of O to the content of Si ((O content)/(Si content)) is larger than 2 (hereinafter, referred to as O rich). When a ZnS—$SiO_2$ layer having a Zn rich composition or an O rich composition is provided in contact with the recording layer 3, the effect of the acceleration of crystallization in the recording layer 3 is significant, and the atomic diffusion between the protective layer 2 and the recording layer 3 is hardly caused. Therefore, such a ZnS—$SiO_2$ layer is suitable as the crystallization accelerating layers 7 and 8.

The lower limit of the thickness of the crystallization accelerating layers 7 and 8 is preferably 1 nm or more, more preferably 5 nm or more, in order to ensure the prevention of the atomic diffusion. Furthermore, the upper limit of the thickness of the crystallization accelerating layers 7 and 8 is not limited to any particular value, as long as laser beams necessary for recording, reproduction and erasure are transmitted to the recording layer 3.

Next, the recording layer 3 is formed of a material having reversibly changeable optical characteristics. In order to produce a phase-changeable recording medium, it is preferable to use a material containing Sb or a chalcogenide such as a material containing Te or Se as a main component. For example, a material comprising Te—Sb—Ge, Te—Sn—Ge, Te—Sb—Ge—Se, Te—Sn—Ge—Au, Ag—In—Sb—Te, In—Sb—Se, In—Te—Se or the like as a main component can be used.

Figure 5:
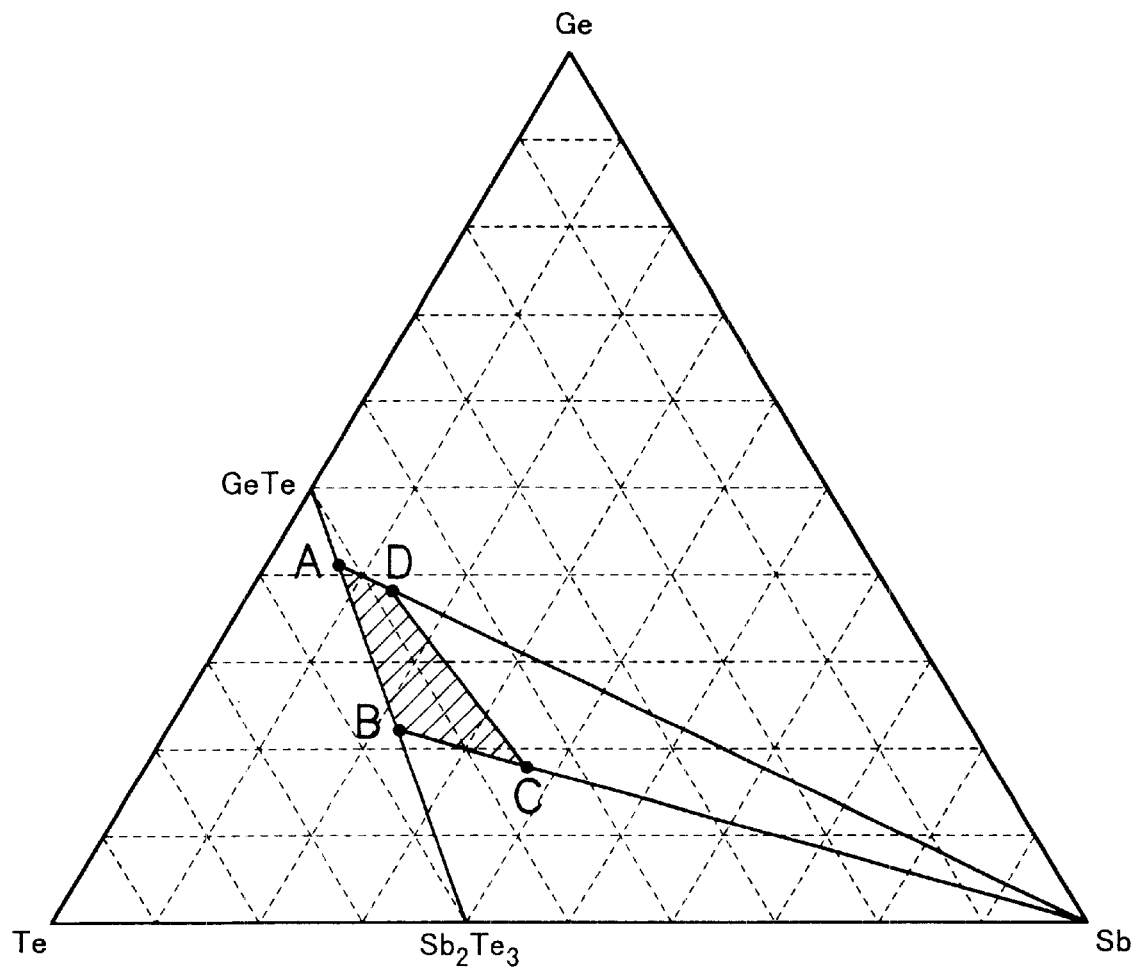
FIG. 5 is a ternary phase diagram showing a preferable composition range of a recording layer of the optical information recording medium of the present invention.

In order to achieve high-density recording, it is preferable to form the recording layer of a material having a composition on the side closer to GeTe on the GeTe—$Sb_2Te_3$ line (or a composition suitably added with Sb to the composition on the GeTe—$Sb_2Te_3$ line) in the ternary phase diagram of Ge—Sb—Te composition (FIG. 5). Conventionally, when such a composition was used, a new problem was caused in that the characteristics in repetitive recording deteriorate. However, the provision of the crystallization accelerating layers 7 and 8 prevents this problem, as described above. Thus, even if a composition relatively on the side of GeTe is used, high-speed rewriting and good repetition characteristics can be achieved.

Furthermore, a preferable composition of the recording layer is $((GeTe)_{1-x}(Sb_2Te_3)_x)_{1-y}Sb_y$, where $1/13 \leq x \leq 1/3$, $0 \leq y \leq 2/3$. That is, the composition in the range represented by the area ABCD shown in FIG. 5 is preferable, where point A is ($Ge_{41.4}Sb_{6.9}Te_{51.7}$), point B is ($Ge_{22.2}Sb_{22.2}Te_{55.6}$), point C is ($Ge_{18.2}Sb_{36.4}Te_{45.5}$), and point D is ($Ge_{38.7}Sb_{12.9}Te_{48.4}$). The recording layer having a composition in this range in a conventional structure cannot always be used at a high linear velocity, but the present invention makes it possible to use such a composition at a high linear velocity.

The recording layer 3 may comprise sputtering gas components (Ar or Kr), H, C, or $H_2O$ as impurities. Furthermore, a trace amount (e.g., about 10 atom % or less) of other substances may be added to the material for the recording layer 3 comprising Ge—Sb—Te as a main component for various purposes. These embodiments are encompassed in the scope of the present invention.

The thickness of the recording layer 3 is preferably from 1 nm to 25 nm. This range is preferable, because a thickness less than 1 nm hardly allows a recording layer material to be formed into a layer, and a thickness more than 25 nm increases heat transfer in the recording layer, so that erasure is likely to occur in adjacent portions during high-density recording.

The reflection layer 5 is formed of a metal such as Au, Ag, Cu, Al, Cr, and Ni, or an alloy of suitable selected metals.

The light beam absorption correction layer 9 is provided for absorption correction, namely, for maintaining Ac/Aa in a predetermined range larger than 1, where Aa represents the absorptance in the amorphous portion in the medium and Ac represents the absorptance in the crystalline portion. The formation of the light beam absorption correction layer 9 allows a medium having Ac/Aa>1 to have Ac/Aa>1. The specific structure of the light beam absorption correction layer 9 will be described later.

Ac/Aa>1 can be achieved in several methods. First, Ac/Aa>1 can be achieved by making the reflectance Ra of the amorphous state higher than the reflectance Rc of the crystalline state. In this case, for example, Ac/Aa value can be larger even if a difference in the reflectance |Ra−Rc| between the amorphous state and the crystalline state is larger. Therefore, a large Ac/Aa value can be obtained. In order words, mark distortion can be suppressed even if rewriting is performed at higher speed.

Furthermore, when the reflectance in the amorphous state is lower than the reflectance in the crystalline state, Ac/Aa>1 can be achieved. In this case, Ac/Aa>1 can be achieved by allowing the medium to transmit light and by satisfying the relationship: 0<Tc<Ta, where Ta is the transmittance of the medium in which the recording layer is amorphous, and Tc is the transmittance of the medium in which the recording layer is crystalline.

Alternatively, Ac/Aa>1 can be achieved by satisfying the relationship: 0<A'c<A'a, where A'a is the absorptance of the layers other than the recording layer when the recording layer is amorphous, and A'c is the absorptance of the layers other than the recording layer when the recording layer is crystalline. More specifically, Ac/Aa>1 can be achieved by providing a layer that absorbs light in the medium and by satisfying the relationship: 0<Ac$_2$<Aa$_2$, where Aa$_2$ is the light absorption of the layer when the recording layer is amorphous, and Ac$_2$ is the light absorption of the layer when the recording layer is crystalline.

The medium having a reflectance relationship of Rc<Ra is advantageous in that the relationship Ac/Aa>1 can be achieved easily, as described above. However, the sum of the reflectance in the amorphous portion and that in the crystalline portion generally is larger in this medium than in the medium having a reflectance relationship of Rc>Ra. Therefore, there may be a disadvantage in that noise is likely to increase during signal reproduction. On the other hand, although this disadvantage is unlikely to be caused, the medium having a reflectance relationship of Rc>Ra is comparatively disadvantageous in that a large reflectance difference Rc−Ra cannot result.

FIGS. 1, 2 and 3 show examples of the above-described three structures, i.e., the structure of Ra>Rc, the structure of Ra<Rc and 0<Tc<Ta, and the structure of Ra<Rc and 0<Ac$_2$<Aa$_2$, respectively.

The light beam absorption correction layer 9 in the structure shown in FIG. 1 facilitates the achievement of Ra>Rc. The light beam absorption correction layer 9 in this case reflects or absorbs laser beams to some extent, and transmits the remaining light.

In order to achieve Ra>Rc effectively, the refractive index n and the absorption coefficient k in the optical constant n−ik in a wavelength range of laser used of a material for the light beam absorption correction layer 9 preferably satisfy the relationship: n<2 and k>2, or n>2 and k<2. As a material satisfying n<2 and k>2, a material containing at least one selected from the group consisting of Au, Ag and Cu can be used. Alternatively, a material containing Al, Cr or Ni may be added to the above-described material. On the other hand, as a material satisfying n>2 and k<2, a material containing at least one selected from the group consisting of Si, Ge, Cr, S, Se and Te can be used.

More specifically, a metal such as Au, Ag, and Cu that has a small thickness, a semiconductor or a dielectric comprising Si, Ge, or Te as a main component, or suitable combinations thereof such as AuCr, CuNi, SiCr or the like can be used. As for a metal, it is preferable to use a metal comprising Au, Ag or Cu as a main component. In this case, in order to adjust the heat conductivity, a metal such as Al, Cr, and Ni may be added, preferably in an amount of 30% or less.

In the structure shown in FIG. 1, the optical absorption correction 9 is preferably provided in any position between the recording layer 3 and the substrate 1. More preferably, in order to suppress thermal interference between recorded marks and keep good cross erasure characteristics, the optical absorption correction 9 is spaced from the recording layer 3 to some extent, for example, in a position immediately above the substrate 1.

A preferable structure of the medium shown in FIG. 1 is as follows: The light beam absorption correction layer 9 is formed of a material having a thickness of 5 nm to 30 nm and satisfying n<2 and k>2, or a material having a thickness of 5 nm to 30 nm and satisfying n>2 and k<2. The protective layer 2 is formed of ZnS—SiO$_2$ and has a thickness of 60 nm to 120 nm. The first crystallization accelerating layer 7 is formed of SiC—SiN and has a thickness of 1 nm to 40 nm. Alternatively, the first crystallization accelerating layer 7 can be formed of AlCrN, SiCrN, GeCrN, or GeNiN and has a thickness of 1 nm to 40 nm. The recording layer 3 is formed of GeSbTe having a composition in the preferable range described above and has a thickness of 5 nm to 25 nm. The second crystallization accelerating layer 8 is formed of SiC—SiN and has a thickness of 10 nm to 80 nm. The second crystallization accelerating layer 8 also can be formed of AlCrN, SiCrN, GeCrN, or GeNiN. The reflectance layer 5 is a metal layer containing Au or Ag as a main component and having a thickness of 20 nm to 120 nm.

The light beam absorption correction layer 9 in the structure shown in FIG. 2 is sufficiently thin to transmit light and achieve 0<Tc<Ta.

In order to achieve 0<Tc<Ta effectively, the refractive index n and the absorption coefficient k in the optical constant n−ik, in a wavelength range of laser used, of a material for the light beam absorption correction layer 9 preferably satisfy the relationship: n<3 and k<6.

As such a material, a material containing at least one selected from the group consisting of Au, Ag, Cu, Al, Cr, Ni, Si and Ge can be used. Specifically, as described above, a metal such as Au, Ag, Cu, Al, Cr or Ni that has a small thickness, a semiconductor or a dielectric comprising Si or Ge as a main component (especially a metal, a semiconductor or a dielectric having a thickness that has a predetermined transmittance with respect to laser beams used for recording, reproduction and erasure), or suitable combinations thereof can be used.

More specifically, it is preferable to use a metal comprising Au, Ag or Cu as a main component, or a semiconductor or a dielectric comprising Ge or Si as a main component.

The thickness of the light beam absorption correction layer 9 is preferably not more than the upper limit value that is defined depending on the material. For example, when Au is used, it is preferable to have a thickness less than about 20 nm.

In the structure shown in FIG. 2, the optical absorption correction 9 is preferably provided in an uppermost position on the side of the recording layers opposite to the direction of laser irradiation.

A preferable structure of the medium shown in FIG. 2 is as follows: The protective layer 2 is formed of ZnS—SiO$_2$ and has a thickness of 100 to 160 nm. The first crystallization accelerating layer 7 is formed of SiC—SiN and has a thickness of 1 to 40 nm. Alternatively, the first crystallization accelerating layer 7 is formed of AlCrN, SiCrN, GeCrN, or GeNiN and has a thickness of 1 to 40 nm. The recording layer 3 is formed of GeSbTe having a composition in the preferable range described above and having a thickness of 5 to 25 nm. The second crystallization accelerating layer 8 is formed of SiC—SiN and has a thickness of 60 to 140 nm. The second crystallization accelerating layer 8 also can be formed of AlCrN, SiCrN, GeCrN, or GeNiN. The light beam absorption correction layer 9 is formed of a material having a thickness of 1 to 20 nm and satisfying n<3 and k<6.

In the structure shown in FIG. 2, the effect of radiating heat may be degraded. In order to avoid this disadvantage, a transparent dielectric layer of AlN, TaN, InO, or SnO (with any valences) may be further laminated on the light beam absorption correction layer 9 of FIG. 2.

The light beam absorption correction layer 9 in the structure shown in FIG. 3 absorbs light to achieve Ac/Aa>1. This structure is obtained by providing a layer that absorbs light to an appropriate extent in a wavelength range of laser used. The light beam absorption correction layer is formed such that the absorptance $Aa_2$ when the recording layer is amorphous is larger than the absorptance $Ac_2$ when the recording layer is crystalline ($0<Ac_2<Aa_2$).

In order to achieve $0<Ac_2<Aa_2$ effectively, the refractive index n and the absorption coefficient k in the optical constant n−ik, in a wavelength range of laser used, of a material for the light beam absorption correction layer 9 preferably satisfy the relationship: n>2 and k>2.

As such a material, a material containing at least one selected from the group consisting of Ge, Si, Cr, Se, S and Te can be used. Specifically, it is preferable to use a semiconductor or a dielectric comprising at least one selected from the group consisting of Ge, Si, Cr, Se, S and Te. For example, GeCr, SiTa, SiW, PbS, or PbTe can be used.

In the structure shown in FIG. 3, the optical absorption correction 9 is preferably provided in a position inside the reflection layer 5.

A preferable structure of the medium shown in FIG. 3 is as follows: The protective layer 2 is formed of $ZnS—SiO_2$ and has a thickness of 100 to 160 nm. The first crystallization accelerating layer 7 is formed of SiC—SiN and has a thickness of 1 to 40 nm. Alternatively, the first crystallization accelerating layer 7 can be formed of AlCrN, SiCrN, GeCrN, or GeNiN and has a thickness of 1 to 40 nm. The recording layer 3 is formed of GeSbTe having a composition in the preferable range described above and having a thickness of 5 to 25 nm. The second crystallization accelerating layer 8 is formed of SiC—SiN and has a thickness of 10 to 80 nm. The second crystallization accelerating layer 8 also can be formed of AlCrN, SiCrN, GeCrN, or GeNiN. The light beam absorption correction layer 9 is formed of a material having a thickness of 5 to 50 nm and satisfying n>2 and k>2. The reflection layer 5 is a metal layer containing Au or Ag as a main component and has a thickness of 20 to 120 nm.

Figure 6:
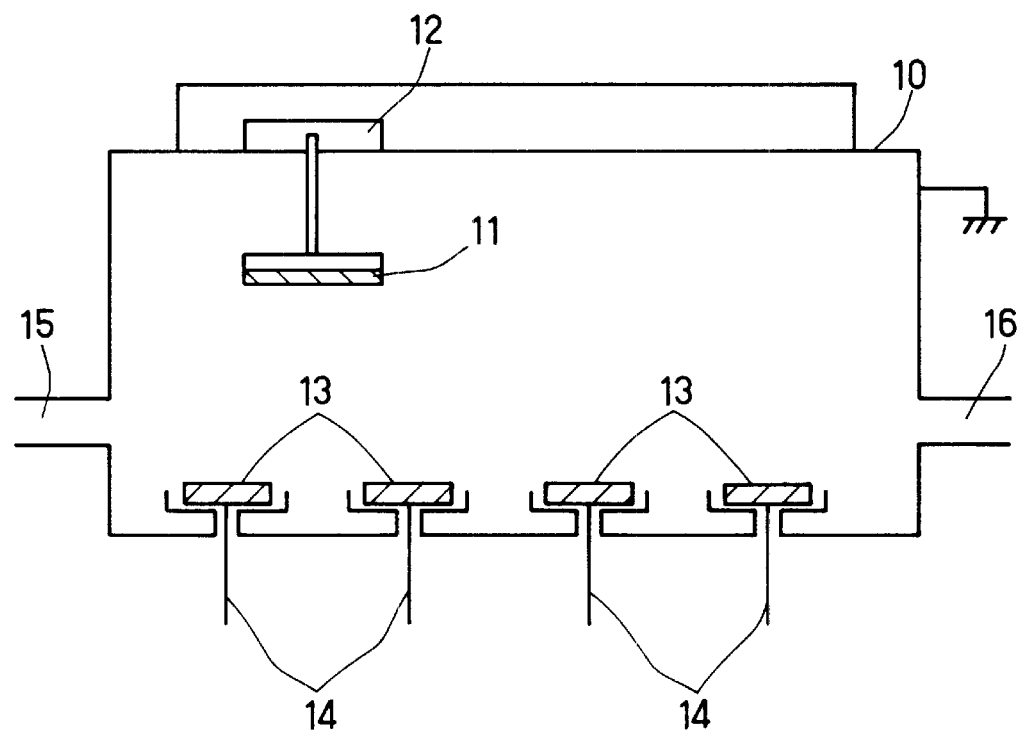
FIG. 6 is a schematic view showing an example of a film-formation apparatus.
Figure 7:
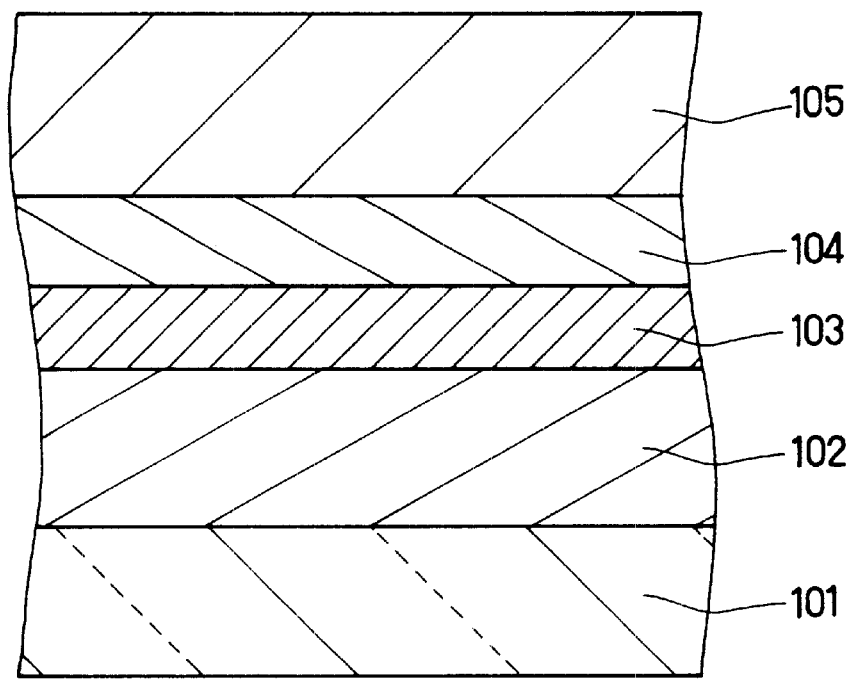
FIG. 7 is a view showing an example of a layered structure of a conventional optical information recording medium.
Figure 8:
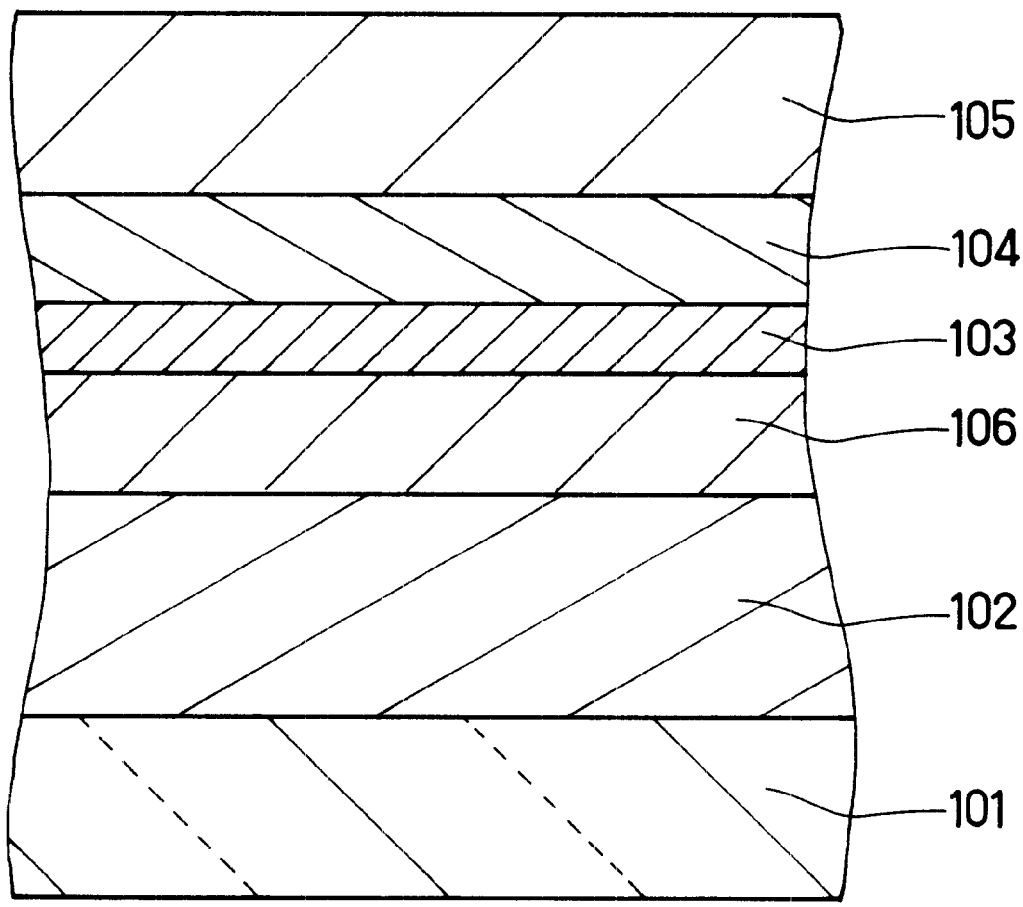
FIG. 8 is a view showing another example of a layered structure of a conventional optical information recording medium.

Next, a method for producing the optical information recording medium of the present invention will be described. A multilayer structure forming the optical information recording medium can be produced by a so-called vapor deposition method such as sputtering, a vacuum evaporation method, or a chemical vapor deposition (CVD) method. FIG. 6 is a schematic view showing an apparatus for forming a film by sputtering, which is an illustrative method.

A vacuum container 10 connects to a vacuum pump (not shown) via an exhaust port 16 so that a high degree of vacuum can be maintained in the vacuum container. A constant flow rate of rare gas, nitrogen, oxygen, or a mixed gas thereof is supplied through a gas supply port 15. A substrate 11 is attached to a driving apparatus 12 for revolving the substrate. A sputtering target 13 connects to a cathode 14. The cathode 14 connects to a dc power supply or a high frequency power supply (not shown) via a switch. The vacuum container is grounded so that the vacuum container 10 and the substrate 11 are utilized as the anodes.

It is preferable to use gas containing a rare gas for formation of each layer. As the rare gas, Ar or Kr can be used alone or in combination, if necessary. A trace amount of nitrogen or oxygen is added to the gas for formation of the recording layer 3 and the protective layer 2 in order to suppress migration of substances in the recording layer during repeated recording. For formation of the recording layer 3, for example, a Ge—Sb—Te target can be used.

When a nitride is used for the crystallization accelerating layers 7 and 8, the use of a reactive sputtering provides good quality films. For example, when GeCrN is used for the crystallization accelerating layers, a material containing GeCr or GeCr and N is used as a target and a mixed gas of rare gas and nitrogen is used as the film-forming gas. Alternatively, a mixed gas of gas containing nitrogen atoms such as $N_2O$, $NO_2$, NO, $N_2$ or a mixed gas of suitable combinations thereof and rare gas can be used. Furthermore, a trace amount of oxygen may be added to the film-forming gas, if necessary, for example, in order to avoid a rigid film or a film having a large stress. This may result in a good quality layer.

Next, a method for recording, reproducing and erasing information in the optical information recording medium formed in the manner described above will be described below. For recording, reproducing and erasing signals, for example, a laser beam source, an optical head including an object lens, a driving device for guiding laser beams to a predetermined position for irradiation, a tracking control device and a focusing control device for controlling the position in the track direction and the direction perpendicular to the surface of the film, a laser driving device for adjusting laser power, and a rotation control device for rotating the medium are used.

For recording or erasing signals, the medium is rotated by the rotation control device, laser beams are focused on a microspot by an optical system and the medium is irradiated with the laser beams. Herein, a power level for formation of an amorphous state that allows a local portion in the recording film to change reversibly to an amorphous state by irradiation of laser beams is represented by $P_1$. A power level for formation of a crystalline state that allows a local portion in the recording film to change reversibly to a crystalline state by irradiation of laser beams is represented by $P_2$. Generally, $P_1$ is larger than $P_2$. Fluctuating the power of the irradiated laser beams between $P_1$ and $P_2$ generates a pulse to form or erase recorded marks. Thus, recording, erasing or overwriting information is performed. In this embodiment, a so-called multiple pulse formed of pulse trains including a peak power level of $P_1$ is utilized. Although types of pulse other than the multiple pulse can be used, multiple pulse is preferable to achieve the improvement in the high speed rewriting and the repetition characteristics of the present invention.

Furthermore, a reproduction power level $P_3$ is a power level of laser beams that provides a sufficient reflectance to reproduce the recorded marks from the medium. $P_3$ is lower than the power levels $P_1$ and $P_2$. The irradiation of laser beams having $P_3$ does not affect the optical state of the recorded marks. Signals obtained by irradiating the medium with laser beams having a power level $P_3$ are read by a detector so as to reproduce the information signals. The wavelength of laser beams is preferably 780 nm or less.

The scanning linear velocity of laser beams for recording or reproducing the optical information recording medium is preferably 4 m/s or more. The present invention provides an optical information recording medium having improved high speed erasure characteristics and repetition characteristics and a high transfer rate. Therefore, a larger scanning linear rate of laser beams makes the advantages of the present invention more significant. The scanning linear velocity of laser beams is more preferably 8 m/s or more.

However, when recording can be performed at very high density, a high transfer rate can be obtained without a high linear velocity. For example, recording can be performed at very high density when at a blue wavelength is used, compared with the case where a red wavelength is used. Therefore, recorded information is reproduced in a larger amount at a blue wavelength, when information in the same distance is reproduced. Thus, the transfer rate becomes high. In this case, a linear velocity of laser beams of 8 m/s or more is not necessarily required.

Examples

The present invention will be described by way of example but is not limited thereto.

First, a recording medium (1) with the structure of FIG. 1 was prepared. A substrate 1 is a disk-shaped polycarbonate resin having a thickness of 0.6 mm and a diameter of 120 mm. A protective layer 2 was formed of a material comprising ZnS and 20 mol % of $SiO_2$. A recording layer 3 was formed of $Ge_{21}Sb_{25}Te_{54}$. Crystallization accelerating layers 7 and 8 were formed of SiC—SiN. A light beam absorption correction layer 9 was formed of Au. The thicknesses of the layers of the recording medium (1) were as follows: 12 nm for the recording layer 3; 80 nm for the protective layer 2; 10 nm and 50 nm for the crystallization accelerating layers 7 and 8, respectively; 40 nm for the reflection layer 5; and 10 nm for the light beam absorption correction layer 9.

As comparative examples, the following recording media were prepared. A recording medium (2) had the same structure as that of the recording medium (1) except that the crystallization accelerating layers 7 and 8 with unchanged thicknesses of 10 nm and 50 nm were formed of the same material as that for the protective layer 2. In other words, the recording layer 3 was sandwiched between the layers formed of the same material as that of the protective layer, and the light beam absorption correction layer 9 was sandwiched between the substrate 1 and the protective layer 2.

A recording medium (3) had the same structure as that of the recording medium (1) except that the light beam absorption correction layer 9 with an unchanged thickness of 10 nm was formed of the same material as that for the protective layer 2. In other words, the recording layer 3 was sandwiched between the crystallization accelerating layers 7 and 8, and only the protective layer 2 was interposed between the crystallization accelerating layer 7 and the substrate 1.

A recording medium (4) had the same structure as that of the recording medium (1) except that the crystallization accelerating layer 8 with an unchanged thickness of 50 nm was formed of the same material as that for the protective layer 2. In other words, the recording layer 3 was sandwiched between the crystallization accelerating layer 7 and the layer formed of the same material as that for the protective layer 2.

A recording medium (5) had the same structure as that of the recording medium (4) except that the light beam absorption correction layer 9 with an unchanged thickness of 10 nm was formed of the same material as that for the protective layer 2. In other words, the recording layer 3 was sandwiched between the crystallization accelerating layer 7 and the layer formed of the same material as that for the protective layer 2, and only the protective layer 2 was interposed between the crystallization accelerating layer 7 and the substrate 1.

A recording medium (6) had the same structure as that of the recording medium (1) except that the crystallization accelerating layer 7 with an unchanged thickness of 10 nm was formed of the same material as that for the protective layer 2. In other words, the recording layer 3 was sandwiched between the layer formed of the same material as that for the protective layer 2 and the crystallization accelerating layer 8.

A recording medium (7) had the same structure as that of the recording medium (6) except that the light beam absorption correction layer 9 with an unchanged thickness of 10 nm was formed of the same material as that for the protective layer 2. In other words, the recording layer 3 was sandwiched between the protective layer 2 and the crystallization accelerating layer 8, and only the protective layer 2 was interposed between the recording layer 3 and the substrate 1.

For the formation of the recording layer 3 and the protective layer 2, gas comprising Ar and 2.5% of nitrogen was supplied at a constant flow rate to maintain the total pressures of 1.0 mTorr and 0.5 mTorr, respectively. Powers of DC 1.27 W/cm$^2$ and RF 5.10 W/cm$^2$, respectively, were applied to the cathodes. For the formation of the reflection layer 5, Ar gas was supplied to maintain the total pressure of 3.0, and power of DC 4.45 W/cm$^2$ was applied.

For the formation of the crystallization accelerating layers 7 and 8 (GeCrN layers), GeCr was used as the target material. The ratio of the Cr content in the CeCrN film to the sum of the Ge content and the Cr content was 20%. A mixed gas of Ar. and nitrogen was used as the sputtering gas. The sputtering gas pressure was 10 mTorr. The partial pressure of nitrogen in the sputtering gas was 40%. The sputtering power density was 6.37 W/cm$^2$.

Testing of optical information recording was carried out with respect to the recording media (1) to (7) produced in the above-described manners.

The measurement was performed under the following conditions: the signal system for recording is an EFM modulation system; the wavelength of the laser beams used is 650 nm; the numerical aperture of the object lens is 0.60; the minimum bit length is 0.28 µm, namely, the minimum mark length is 0.41 µm; the disk rotation rates are 6 m/s and 12 m/s at the linear velocity. A substrate having a track pitch of 1.20 µm, i.e., a groove and a land are alternately formed at every 0.60 µm, was used.

The overwrite erase ratio at a high linear velocity and the characteristics in repetitive recording were evaluated.

The evaluation of the high-speed erasure characteristics was performed as follows: A mark with a 3T length in EFM signal system was recorded by laser beams with a predetermined power. Thereafter, the mark was overwritten by a mark with a 11T length. Then, an erasure ratio was measured. In the recording medium denoted by "A" in Table 1, the overwrite erasure ratio was 30 dB or more. In the recording medium denoted by "B", the overwrite erasure ratio was less than 30 dB.

For the evaluation of the characteristics in repetitive recording, random marks having lengths from 3 T to 11 T when the minimum mark length was 0.41 µm in EFM signal system were recorded in groove portions. The characteristics were evaluated on the basis of the ratio of a jitter value between front ends or rear ends of the marks to a window width T (hereinafter, referred to as a jitter value). The jitter value was measured after 100,000 times of repetitive recording to determine the average increment in the jitter value at the front ends and the rear ends with respect to the jitter value measured after 10 times of repetitive recording. In the recording medium denoted by "A", the average increment was 3% or less. In the recording medium denoted by "B", the average increment was more than 3%. Table 1 shows the results of the evaluation of the media (1) to (7).

TABLE 1

| Medium No. | Linear velocity 6 m/s | | Linear velocity 12 m/s | |
|---|---|---|---|---|
| | Repetition characteristics | Overwrite erasure ratio | Repetition characteristics | Overwrite erasure ratio |
| (1) | A | A | A | A |
| (2) | B | A | B | B |
| (3) | A | A | A | B |
| (4) | A | A | A | B |
| (5) | A | A | A | B |
| (6) | B | A | B | A |
| (7) | B | A | B | B |

The results shown in Table 1 reveal that the recording medium (2) in which the crystallization accelerating layer is not formed either on or under the recording layer, and the recording media (6) and (7) in which the crystallization acceleration layer is formed only on the surface of the recording layer on the side of the reflection layer, have poor repetition characteristics. On the other hand, the recording media comprising the crystallization accelerating layers both on and under the recording layer or the recording media comprising the crystallization accelerating layer only on the surface of the recording layer on the side of the substrate have good repetition characteristics.

Among the recording media (1), (2), (4) and (6) that include the light beam absorption correction layer 9, the recording media (2) and (4) in which the crystallization accelerating layer 8 is not formed on the recording on the side of the reflection layer 5 have poor overwrite erasure ratios at a high linear velocity of 12 m/s. The recording medium (6) comprising the crystallization accelerating layer 8 only on the surface of the recording on the side of the reflection layer 5 has a good overwrite erasure ratio at a high linear velocity of 12 m/s but poor repetition characteristics.

For the recording medium (3) comprising the crystallization accelerating layers 7 and 8 on and under the recording layer 3 but not comprising the light beam absorption correction layer 9, and the recording medium (5) comprising the crystallization accelerating layer 7 only on the surface of the recording layer 3 on the side of the substrate 1 but not comprising the light beam absorption correction layer 9, the overwrite erasure ratios drop at a high linear velocity of 12 m/s.

In conclusion, the recording medium (1) of the present invention that comprises the crystallization accelerating layers 7 and 8 and the light beam absorption correction layer 9 allows high-speed erasure and has good repetition characteristics.

Next, a recording medium (8) with the same structure as shown in FIG. 2 was formed of the same materials in the same manner as those for the zrecording medium (1). The thicknesses of the layers of the recording medium (8) were as follows: 110 nm for the protective layer 2; 10 nm and 120 nm for the crystallization accelerating layers 7 and 8, respectively; 8 nm for the recording layer 3; and 10 nm for the light beam absorption correction layer 9.

As comparative examples, the following recording media were prepared. A recording medium (9) had the same structure as that of the recording medium (8) except that the crystallization accelerating layers 7 and 8 with unchanged thicknesses of 10 nm and 120 nm were formed of the same material as that for the protective layer 2. In other words, the recording layer 3 was sandwiched between the layers formed of the same material as that of the protective layer.

A recording medium (10) had the same structure as that of the recording medium (8) except that the light beam absorption correction layer 9 was replaced with the reflection layer 6 with a thickness of 50 nm. In other words, the recording layer 3 was sandwiched between the crystallization accelerating layers 7 and 8, and the crystallization accelerating layer 8 is sandwiched between the recording layer 3 and the reflection layer 5.

Furthermore, a recording medium (11) with the same structure as shown in FIG. 3 was formed of the same materials as those for the recording medium (1) except that the light beam absorption correction layer is formed of SiW. The thicknesses of the layers of the recording medium (11) were as follows: 130 nm for the protective layer 2; 10 nm and 40 nm for the crystallization accelerating layers 7 and 8, respectively; 12 nm for the recording layer 3; 40 nm for the reflection layer 5; and 30 nm for the light beam absorption correction layer 9.

As comparative examples, the following recording media were prepared. A recording medium (12) had the same structure as that of the recording medium (11) except that the crystallization accelerating layers 7 and 8 with unchanged thicknesses of 10 nm and 40 nm were formed of the same material as that for the protective layer 2. In other words, the recording layer 3 was sandwiched between the layers formed of the same material as that of the protective layer.

A recording medium (13) had the same structure as that of the recording medium (11) except that the light beam absorption correction layer 9 with a unchanged thickness of 40 nm was formed of the same material for the protective layer 2. In other words, a layer formed of the same material as that for the protective layer was sandwiched between the crystallization accelerating layer 8 and the reflection layer 5.

Table 2 shows the results of the evaluation of the characteristics with respect to the recording media (8) to (13). Table 2 shows that the recording media (8) and (11) have high-speed erasure characteristics and good repetition characteristics.

TABLE 2

| Medium No. | Linear velocity 6 m/s | | Linear velocity 12 m/s | |
|---|---|---|---|---|
| | Repetition characteristics | Overwrite erasure ratio | Repetition characteristics | Overwrite erasure ratio |
| (8) | A | A | A | A |
| (9) | B | A | B | B |
| (10) | A | A | A | B |
| (11) | A | A | A | A |
| (12) | B | A | B | B |
| (13) | A | A | A | B |

These results have a similar tendency to those of the structure of FIG. 1. In the layer structures of FIGS. 2 and 3 as well, it is confirmed that when a pair of crystallization accelerating layers are attached via the recording layer, and the light beam absorption correction layer is formed to achieve Ac>Aa, the optical information recording medium can have excellent repetition characteristics and overwrite erasing ratios regardless of the linear velocity.

Furthermore, a recording medium (14) was formed of the same materials and in the same layer structure as those for the recording medium (1) except that the recording layer was composed of $Ge_{30.1}Sb_{17.3}Te_{52.6}$.

For comparison, a recording medium (15) was formed of the same materials and in the same layer structure as those for the recording medium (14) except that the recording layer was composed of $Ge_{14.3}Sb_{28.6}Te_{57.1}$.

As other comparative examples, recording media (16) and (17) were formed to have the same layer structure as that for the recording medium (1) except that the crystallization accelerating layers 7 and 8 were formed of the material for the protective layer 2 and that the recording layers were composed of $Ge_{30.1}Sb_{17.3}Te_{52.6}$, and $Ge_{14.3}Sb_{28.6}Te_{57.1}$, respectively.

These media were evaluated regarding the characteristics in repetitive recording, the overwrite erasure ratio at a high linear velocity and the environment resistance test characteristics. The repetition characteristics and the overwrite characteristics at a high linear velocity were evaluated in the same manner as in the examples above.

The environment resistance characteristics were evaluated in the following manner. First, marks with a 3T length were recorded at 12 m/s under the same conditions as used for the evaluation of the overwrite characteristics. Then, jitter values (obtained by dividing the dislocation amount between the front ends and the rear ends of the recorded marks by the window width) were measured. Then, the accelerated weathering test was performed by keeping the media at a high temperature of 90° C. and a relative humidity of 25%. Thereafter, the jitter values of the recorded marks were measured again to determine an increment in the jitter values between the front ends and the rear ends with respect to the jitter values measured before the accelerated test. In the recording medium denoted by "A", the increment was 2% or less with respect to both of the front ends and the rear ends. In the recording medium denoted by "B", the increment was 2% or more with respect to either of the front ends or the rear ends.

Table 3 shows the results of the evaluation of the media (14) to (17) together with those of the recording medium (1) regarding the environment resistance test performed in the same manner.

TABLE 3

| Medium No. | Linear velocity 6 m/s | | Linear velocity 12 m/s | | Environment resistance test characteristics |
|---|---|---|---|---|---|
| | Repetition characteristics | Overwrite erasure ratio | Repetition characteristics | Overwrite erasure ratio | |
| (14) | A | A | A | A | A |
| (15) | A | A | A | A | B |
| (16) | B | A | B | B | A |
| (17) | B | A | B | A | B |
| (1) | A | A | A | A | A |

According to Table 3, recording media (15) and (17) composed of $Ge_{14.3}Sb_{28.6}Te_{57.1}$, which is a composition that contains a relatively small amount of Ge and is on the $GeTe-Sb_2Te_3$ line have good overwrite erasure ratios but insufficient environment resistance test characteristics. On the other hand, recording media (1), (14) and (17) have sufficient environment resistance test characteristics, because when the compositions of these media are used, the amorphous portions can be thermally stabilized.

Furthermore, the recording medium (16) has poor repetition characteristics and a poor erasure ratio at high linear velocity because no crystallization accelerating layer is provided. On the other hand, recording media (1) and (14) including the crystallization accelerating layers on both sides and the light beam absorption correction layer 9 have good characteristics in all the aspects of the repetition characteristics, the erasure ratio at a high linear velocity and the environment resistance test characteristics.

The results of Table 3 have confirmed that the recording layer compositions that were unable to provide a high erasure ratio under high linear velocity conditions can result in an optical information recording medium having excellent characteristics in repetitive recording and an excellent overwrite erasure ratio by providing the crystallization accelerating layers on both the surfaces of the recording layer and forming the light beam absorption correction layer to achieve Ac>Aa.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium comprising a recording layer that changes reversibly between a crystalline state and an amorphous state, irradiation of the recording layer with laser beams at a predetermined wavelength changing the recording layer from one selected from the group consisting of the crystalline state and the amorphous state to the other state, and a light beam absorption correction layer, wherein
crystalline accelerating layers for accelerating the change of the recording layer from the amorphous state to the crystalline state are formed in contact with both surfaces of the recording layer,
an absorptance Ac of the laser beams in the recording layer when the recording layer is in the crystalline state is larger than an absorptance Aa of the laser beams in the recording layer when the recording layer is in the amorphous state,
a reflectance Rc of laser beams at the predetermined wavelength in the optical information recording medium when the recording layer is in the crystalline state is smaller than a reflectance Ra of the laser beams at the predetermined wavelength in the optical information recording medium when the recording layer is in the amorphous state,
a refractive index of the light beam absorption correction layer at the predetermined wavelength of the laser beams is smaller than 2, and
an absorption coefficient of the light beam absorption correction layer at the predetermined wavelength of the laser beams is larger than 2.

2. The optical information recording medium according to claim 1,
wherein the light beam absorption correction layer comprises at least one selected from the group consisting of Au, Ag, Cu, Al, Cr and Ni.

3. The optical information recording medium according to claim 1,
wherein the recording layer is formed of a phase-changeable material comprising at least one selected from the group consisting of Te, Se and Sb.

4. The optical information recording medium according to claim 1,
wherein the recording layer is formed of a phase-changeable material comprising at least one selected from the group consisting of Te, Sb and Ge.

5. The optical information recording medium according to claim 1,
wherein at least one of the crystallization accelerating layers is formed of a material comprising at least one selected from the group consisting of a nitride, an oxide and a carbide as a main component.

6. The optical information recording medium according to claim 1,
wherein at least one of the crystallization accelerating layers does not comprise S as a main component.

7. The optical information recording medium according to claim 1,
wherein at least one of the crystallization accelerating layers comprises Ge and N.

8. The optical information recording medium according to claim 1,
wherein at least one of the crystallization accelerating layers comprises Zn and S, and an atomic ratio of Zn to S in the at least one crystallization accelerating layer is larger than 1.

9. The optical information recording medium according to claim 1,
wherein at least one of the crystallization accelerating layers comprises Zn, S, Si and O as main components, and
an atomic ratio of O to Si in the at least one crystallization accelerating layer is larger than 2.

10. The optical information recording medium according to claim 1,
wherein a thickness of the recording layer is 1 nm to 25 nm.

11. The optical information recording medium according to claim 1,
wherein a thickness of at least one of the crystallization accelerating layers is not less than 1 nm.

12. The optical information recording medium according to claim 1,
wherein a composition of the recording layer is $((GeTe)_{1-x}(Sb_2Te_3)_x)_{1-y}Sb_y$, wherein $1/13<x<1/3$, $0<y<2/13$.

13. The optical information recording medium according to claim 1,
wherein a protective layer is provided in contact with at least one of the crystallization accelerating layers.

14. The optical information recording medium according to claim 1, further comprising a light beam absorption correction layer,
wherein the absorptance Ac is not more than the absorptance Aa when the light beam absorption correction layer is not present, and the presence of the light beam absorption correction layer makes the absorptance Ac larger than the absorptance Aa.

15. An optical information recording medium comprising a recording layer that changes reversibly between a crystalline state and an amorphous state, irradiation of the recording layer with laser beams at a predetermined wavelength changing the recording layer from one selected from the group consisting of the crystalline state and the amorphous state to the other state, and
a light beam absorption correction layer,
wherein
crystalline accelerating layers for accelerating the change of the recording layer from the amorphous state to the crystalline state are formed in contact with both surfaces of the recording layer,
an absorptance Ac of the laser beams in the recording layer when the recording layer is in the crystalline state is larger than an absorptance Aa of the laser beams in the recording layer when the recording layer is in the amorphous state,
a reflectance Rc of laser beams at the predetermined wavelength in the optical information recording medium when the recording layer is in the crystalline state is smaller than a reflectance Ra of the laser beams at the predetermined wavelength in the optical information recording medium when the recording layer is in the amorphous state,
a refractive index of the light beam absorption correction layer at the predetermined wavelength of the laser beams is larger than 2, and
an absorption coefficient of the light beam absorption correction layer at the predetermined wavelength of the laser beams is smaller than 2.

16. The optical information recording medium according to claim 15,
wherein the light beam absorption correction layer comprises at least one selected from the group consisting of Si, Ge, Cr, S, Se and Te.

17. The optical information recording medium according to claim 15,
wherein the recording layer is formed of a phase-changeable material comprising at least one selected from the group consisting of Te, Se and Sb.

18. The optical information recording medium according to claim 15,
wherein the recording layer is formed of a phase-changeable material comprising at least one selected from the group consisting of Te, Sb and Ge.

19. The optical information recording medium according to claim 15,
wherein at least one of the crystallization accelerating layers is formed of a material comprising at least one selected from the group consisting of a nitride, an oxide and a carbide as a main component.

20. The optical information recording medium according to claim 15,
wherein at least one of the crystallization accelerating layers does not comprise S as a main component.

21. The optical information recording medium according to claim 15,
wherein at least one of the crystallization accelerating layers comprises Ge and N.

22. The optical information recording medium according to claim 15,
wherein at least one of the crystallization accelerating layers comprises Zn and S, and an atomic ratio of Zn to S in the crystallization accelerating layer is larger than 1.

23. The optical information recording medium according to claim 15,
wherein at least one of the crystallization accelerating layers comprises Zn, S, Si and O as main components, and
an atomic ratio of O to Si in the crystallization accelerating layer is larger than 2.

24. The optical information recording medium according to claim 15, wherein a thickness of the recording layer is 1 nm to 25 nm.

25. The optical information recording medium according to claim 15,
wherein a thickness of at least one of the crystallization accelerating layers is not less than 1 nm.

26. The optical information recording medium according to claim 15,
wherein a composition of the recording layer is $((GeTe)_{1-x}(Sb_2Te_3)_{1-x}Sb_y)$, wherein $1/13 \leq x \leq 1/3$, $0 \leq y \leq 2/3$.

27. The optical information recording medium according to claim 15,
wherein a protective layer is provided in contact with at least one of the crystallization accelerating layers.

28. The optical information recording medium according to claim 15, further comprising a light beam absorption correction layer,
wherein the absorptance Ac is not more than the absorptance Aa when the light beam absorption correction layer is not present, and the presence of the light beam absorption correction layer makes the absorptance Ac larger than the absorptance Aa.

29. An optical information recording medium comprising a recording layer that changes reversibly between a crystalline state and an amorphous state, irradiation of the recording layer with laser beams at a predetermined wavelength changing the recording layer from one selected from the group consisting of the crystalline state and the amorphous state to the other state, and a light beam absorption correction layer,
wherein
an absorptance Ac of the laser beams in the recording layer when the recording layer is in the crystalline state is larger than an absorptance Aa of the laser beams in the recording layer when the recording layer is in the amorphous state,
crystalline accelerating layers for accelerating the change of the recording layer from the amorphous state to the crystalline state are formed in contact with both surfaces of the recording layer,
a refractive index of the light beam absorption correction layer at the predetermined wavelength of the laser beams is smaller than 3, and
an absorption coefficient of the light beam absorption correction layer at the predetermined wavelength of the laser beams is smaller than 6.

30. The optical information recording medium according to claim 29,
wherein the light beam absorption correction layer comprises at least one selected from the group consisting of Au, Ag, Cu, Al, Cr, Ni, Si and Ge.

31. The optical information recording medium according to claim 29,
wherein a thickness of the light beam absorption correction layer is not more than 20 nm.

32. The optical information recording medium according to claim 29,
wherein the recording layer is formed of a phase-changeable material comprising at least one selected from the group consisting of Te, Se and Sb.

33. The optical information recording medium according to claim 29,
wherein the recording layer is formed of a phase-changeable material comprising at least one selected from the group consisting of Te, Sb and Ge.

34. The optical information recording medium according to claim 29,
wherein at least one of the crystallization accelerating layers is formed of a material comprising at least one selected from the group consisting of a nitride, an oxide and a carbide as a main component.

35. The optical information recording medium according to claim 29,
wherein at least one of the crystallization accelerating layers does not comprise S as a main component.

36. The optical information recording medium according to claim 29,
wherein at least one of the crystallization accelerating layers comprises Ge and N.

37. The optical information recording medium according to claim 29,
wherein at least one of the crystallization accelerating layers comprises Zn and S, and an atomic ratio of Zn to S in the crystallization accelerating layer is larger than 1.

38. The optical information recording medium according to claim 29,
wherein at least one of the crystallization accelerating layers comprises Zn, S, Si and O as main components, and
an atomic ratio of O to Si in the crystallization accelerating layer is larger than 2.

39. The optical information recording medium according to claim 29,
wherein a thickness of the recording layer is 1 nm to 25 nm.

40. The optical information recording medium according to claim 29,
wherein a thickness of at least one of the crystallization accelerating layers is not less than 1 nm.

41. The optical information recording medium according to claim 29,
wherein a composition of the recording layer is $((GeTe)_{1-x}(Sb_2Te_3)_x)_{1-y}Sb_y$, wherein $1/13 \leq x \leq 1/3$, $0 \leq y \leq 2/3$.

42. The optical information recording medium according to claim 29,
wherein a protective layer is provided in contact with at least one of the crystallization accelerating layers.

43. The optical information recording medium according to claim 29,
wherein the absorptance Ac is not more than the absorptance Aa when the light beam absorption correction layer is not present, and the presence of the light beam absorption correction layer makes the absorptance Ac larger than the absorptance Aa.

44. An optical information recording medium comprising a recording layer that changes reversibly between a crystalline state and an amorphous state, irradiation of the recording layer with laser beams at a predetermined wavelength changing the recording layer from one selected from the group consisting of the crystalline state and the amorphous state to the other state,
wherein
an absorptance Ac of the laser beams in the recording layer when the recording layer is in the crystalline state is larger than an absorptance Aa of the laser beams in the recording layer when the recording layer is in the amorphous state,
crystalline accelerating layers for accelerating the change of the recording layer from the amorphous state to the crystalline state are formed in contact with both surfaces of the recording layer, and an absorptance A'c of laser beams at the predetermined wavelength in layers in the optical information recording medium other than the recording layer when the recording layer is in the crystalline state is smaller than an absorptance A'a of the laser beams at the predetermined wavelength in the layers in the optical information medium other than the recording layer when the recording layer is in the amorphous state.

45. The optical information recording medium according to claim 44, further comprising a light beam absorption correction layer, wherein a refractive index of the light beam absorption correction layer at the predetermined wavelength of the laser beams is larger than 2, and an absorption coefficient of the light beam absorption correction layer at the predetermined wavelength of the laser beams is larger than 2.

46. The optical information recording medium according to claim 45, wherein the light beam absorption correction layer comprises at least one selected from the group consisting of Ge, Si, Cr, Se, S and Te.

47. The optical information recording medium according to claim 44, wherein the recording layer is formed of a phase-changeable material comprising at least one selected from the group consisting of Te, Se and Sb.

48. The optical information recording medium according to claim 44, wherein the recording layer is formed of a phase-changeable material comprising at least one selected from the group consisting of Te, Sb and Ge.

49. The optical information recording medium according to claim 44, wherein at least one of the crystallization accelerating layers is formed of a material comprising at least one selected from the group consisting of a nitride, an oxide and a carbide as a main component.

50. The optical information recording medium according to claim 44, wherein at least one of the crystallization accelerating layers does not comprise S as a main component.

51. The optical information recording medium according to claim 44, wherein at least one of the crystallization accelerating layers comprises Ge and N.

52. The optical information recording medium according to claim 44, wherein at least one of the crystallization accelerating layers comprises Zn and S, and an atomic ratio of Zn to S in the crystallization accelerating layer is larger than 1.

53. The optical information recording medium according to claim 44, wherein at least one of the crystallization accelerating layers comprises Zn, S, Si and O as main components, and an atomic ratio of O to Si in the crystallization accelerating layer is larger than 2.

54. The optical information recording medium according to claim 44, wherein a thickness of the recording layer is 1 nm to 25 nm.

55. The optical information recording medium according to claim 44, wherein a thickness of at least one of the crystallization accelerating layers is not less than 1 nm.

56. The optical information recording medium according to claim 44, wherein a composition of the recording layer is $((GeTe)_{1-x}(Sb_2Te_3)_x)_{1-y}Sb_y$, wherein $1/13 \leq x < 1/3$, $0 \leq y \leq 2/3$.

57. The optical information recording medium according to claim 44, wherein a protective layer is provided in contact with at least one of the crystallization accelerating layers.

58. The optical information recording medium according to claim 44, further comprising a light beam absorption correction layer, wherein the absorptance Ac is not more than the absorptance Aa when the light beam absorption correction layer is not present, and the presence of the light beam absorption correction layer makes the absorptance Ac larger than the absorptance Aa.

59. A method for recording and reproducing optical information with an optical information recording medium, the optical information recording medium comprising a recording layer that changes reversibly between a crystalline state and an amorphous sate, irradiation of the recording layer with laser beams at a predetermined wavelength changing the recording layer from one selected from the group consisting of the crystalline state and the amorphous state to the other state, wherein an absorptance Ac of the laser beams in the recording layer when the recording layer is in the crystalline state is larger than an absorptance Aa of the laser beams in the recording layer when the recording layer is in the amorphous state, crystalline accelerating layers are formed in contact with both surfaces of the recording layer, and wherein an absorptance A'c of laser beams at the predetermined wavelength in layers in the optical information medium other than the recording layer when the recording layer is in the crystalline state is smaller than an absorptance A'a of the laser beams at the predetermined wavelength in the layers in the optical information medium other than the recording layer when the recording layer is in the amorphous state, the method comprising the steps of focusing laser beams on a microspot on the optical information recording medium by an optical system, and irradiating the recording layer with the laser beams, wherein a power level of the laser beams is fluctuated between a first power level $P_1$ and a second power level $P_2$ to change optical information in the recording layer, and the change of the optical information is selected from the group consisting of recording, erasure and overwriting, and the optical information is reproduced with the laser beams of a third power level $P_3$, where the first power level $P_1$ is an amorphous state-formation level that allows a local portion in the recording film to change reversibly from the crystalline state to the amorphous state by irradiation of the laser beams, the second power level $P_2$ is a crystalline stat-formation level that allows a local portion in the recording film to change reversibly from the amorphous state to the crystalline state by irradiation of the laser beams, and the third power level $P_3$ is a reproduction level that is lower than the power levels $P_1$ and $P_2$, the irradiation level of the laser beams at $P_3$ does not affect an optical state of the recording layer, and the irradiation of the laser beams at $P_3$ provides a sufficient reflectance to reproduce optical information.

* * * * *

UNITED STATES PATENT AND TRADEMARK OFFICE
CERTIFICATE OF CORRECTION

PATENT NO.    : 6,477,135 B1
DATED         : November 5, 2002
INVENTOR(S)   : Uno et al.

It is certified that error appears in the above-identified patent and that said Letters Patent is hereby corrected as shown below:

Column 19,
Line 45, "$1/13 < x < 1/3$, $0 < y < 2/13$." should read -- $1/13 \leq x \leq 1/3$, $0 \leq y \leq 2/3$. --

Signed and Sealed this

Twenty-fifth Day of November, 2003

JAMES E. ROGAN
*Director of the United States Patent and Trademark Office*